(12) United States Patent
Inatomi et al.

(10) Patent No.: US 7,693,250 B2
(45) Date of Patent: Apr. 6, 2010

(54) FAST REACTOR CONTROLLED WITH A REFLECTOR

(75) Inventors: Takanari Inatomi, Kawasaki (JP); Yasuhiro Sakai, Zama (JP); Toshiyuki Suzuki, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 234 days.

(21) Appl. No.: 11/934,300

(22) Filed: Nov. 2, 2007

(65) Prior Publication Data

US 2008/0232534 A1  Sep. 25, 2008

(30) Foreign Application Priority Data

Nov. 7, 2006  (JP) ............................. 2006-301577

(51) Int. Cl.
| | |
|---|---|
| G21C 7/06 | (2006.01) |
| G21F 5/00 | (2006.01) |
| G21C 5/00 | (2006.01) |
| G21C 3/00 | (2006.01) |
| G21C 1/04 | (2006.01) |

(52) U.S. Cl. ...................... 376/220; 376/458; 376/904; 376/423; 376/351; 250/506.1; 250/507.1

(58) Field of Classification Search ................ 376/458, 376/220, 904, 423, 351, 459, 210; 250/506.1, 250/507.1

See application file for complete search history.

(56) References Cited

U.S. PATENT DOCUMENTS

| 5,420,897 A | 5/1995 | Kasai et al. |
| 2005/0220251 A1* | 10/2005 | Yokoyama et al. .......... 376/220 |

OTHER PUBLICATIONS

J. A. Bucholz, "Overview of Shielding Analyses for the MHTGR from 1986 to 1991", 8th International Conference on Reactor Shielding (Apr. 24-27, 1994).*

* cited by examiner

*Primary Examiner*—Rick Palabrica
*Assistant Examiner*—Erin M Boyd
(74) *Attorney, Agent, or Firm*—Oblon, Spivak, McClelland, Maier & Neustadt, P.C.

(57) ABSTRACT

A fast reactor 1 controlled with a reflector comprises: a reactor vessel 7 accommodating therein a coolant 5; a reactor core 2 disposed in the reactor vessel 7 and immersed in the coolant 5; and a reflector 4 that vertically moves for adjusting leakage of neutrons generated from the reactor core 2 to control a reactivity of the reactor core 2, the reflector 4 including a neutron reflecting part 4*a* disposed on an outside of the reactor core 2 in a vertically movable manner, the neutron reflecting part 4*a* having a neutron reflecting ability higher than that of the coolant 5, and a cavity part 4*b* positioned above the neutron reflecting part 4*a*, the cavity part 4*b* having a neutron reflecting ability lower than that of the coolant 5. The neutron reflecting part 4*a* is formed of a plurality of metal plates 37 that are stacked on each other. Each of the metal plates 37 has a plurality of coolant channels 36 through which the coolant 5 flows.

8 Claims, 6 Drawing Sheets

FAST REACTOR CONTROLLED WITH A REFLECTOR

CROSS REFERENCE TO RELATED APPLICATION

This application is based upon and claims the benefit of priority from the prior Japanese Patent Application No. 2006-301577 filed on Nov. 7, 2006, the entire contents of which are incorporated herein by reference.

FIELD OF THE INVENTION

The present invention relates to a reflector control type fast reactor that controls a reactivity of a reactor core by vertically moving a reflector.

BACKGROUND ART

FIG. 5 shows an example of a conventional fast reactor 1 disclosed in Japanese Patent Registration No. 3126524. As shown in FIG. 5, the conventional fast reactor 1 includes a reactor vessel 7 in which the fast reactor 1 is accommodated, and a reactor core 2 disposed in the reactor vessel 7 and loading thereon a fuel assembly. The reactor core 2 has generally a cylindrical shape. An outer circumference of the reactor core 2 is surrounded by a core barrel 3 that protects the reactor core 2. A reflector 4 is arranged outside the core barrel 3. The reflector 4 is connected to a reflector drive unit 12 through a drive shaft 11. The reflector 4 is capable of vertically moving around the reactor core by the reflector drive unit 12 so as to control a reactivity of the reactor core 2.

Disposed outside the reflector 4 is a partition wall 6 surrounding the reflector 4 and forming an inner wall of a channel for a coolant 5. The channel for the coolant 5 is formed in a gap between the reactor vessel 7 and the partition wall 6. In the channel for the coolant 5 between the reactor vessel 7 and the partition wall 6, there is disposed a neutron shielding member 8 that surrounds the reactor core 2. The reactor core 2, the core barrel 3, the partition wall 6, and the neutron shielding member 8 are all placed on and supported by a reactor-core support plate 13.

FIG. 6 shows an example of the structure of the reflector 4 disclosed in Japanese Patent Registration No. 3126502. The reflector 4 includes a neutron reflecting part 4a and a cavity part 4b integrally disposed on an upper portion of the neutron reflecting part 4a. The cavity part 4b is formed of a housing. An inside of the housing is filled with a gas 41 whose neutron reflecting ability is inferior to that of a coolant 5, or is maintained in a vacuum condition. Owing to the cavity part 4b, a reactivity can be suppressed, as compared with a case in which an outside of a core barrel 3 is covered with the coolant 5. Thus, enrichment of fuel can be increased, whereby a reactivity life of a reactor core 2 can be elongated. A reflector drive unit 12 is connected to an upper portion of the neutron reflecting part 4a through a drive shaft 11. In FIG. 6, the same parts as those in FIG. 5 are shown by the same reference numbers.

A temperature of the coolant 5 in the fast reactor 1 is between about 350° C. and about 500° C. To be specific, the temperature of the coolant 5 is about 500° C. near the reactor core 2 inside the core barrel 3, and is about 350° C. near the neutron shielding member 8 outside the partition wall 6. Namely, the temperature of the coolant 5 near the core barrel 3 and the temperature of the coolant 5 near the partition wall 6 vary by about 150° C. In addition, since the coolant 5 is heated from about 350° C. to about 500° C, the temperature of the coolant 5 inside the core barrel 3 axially varies by about 150° C.

In the neutron reflecting part 4a and the cavity part 4b of the reflector 4, since the temperature significantly varies in both the radial and the axial directions, the reflector 4 may be deformed by a thermal expansion difference. The deformed reflector 4 may come into contact with the core barrel 3 and/or the partition wall 6, when the reflector 4 is dropped down in order to urgently shut down the fast reactor 1. In this case, the reflector 4 may fail to fall down within a predetermined period of time.

In addition, because of the temperature difference of the reflector 4, there is a possibility that a thermal stress and/or a creep generate in the reflector 4 to damage the neutron reflecting part 4a and/or the cavity part 4b of the reflector 4.

SUMMARY OF THE INVENTION

The present invention has been made in view of the above circumstances. The object of the present invention is to provide a reliable fast reflector control type fast reactor having a reflector that is difficult to be deformed by a thermal expansion and/or a thermal stress, and thus has an excellent structural robustness.

The present invention is a reflector control type fast reactor comprising: a reactor vessel accommodating therein a coolant; a reactor core disposed in the reactor vessel and immersed in the coolant; and a reflector that vertically moves for adjusting leakage of neutrons generated from the reactor core to control a reactivity of the reactor core, the reflector including a neutron reflecting part disposed on an outside of the reactor core in a vertically movable manner, and a cavity part positioned above the neutron reflecting part, the cavity part having a neutron reflecting ability lower than that of the coolant; wherein the neutron reflecting part is formed of a plurality of metal plates that are stacked on each other, and each of the metal plates has a plurality of coolant channels through which the coolant flows.

The present invention is the reflector control type fast reactor wherein the number of the coolant channels in each of the metal plates per unit area increases from a side of the reactor vessel to a side of the reactor core.

The present invention is the reflector control type fast reactor wherein the cavity part includes a frame, and a plurality of sealable containers of a box shape that are held in the frame.

The present invention is the reflector control type fast reactor wherein the frame is formed of a plurality of frame units, and the respective frame units are connected to each other by a bolt.

The present invention is the reflector control type fast reactor wherein the respective sealable containers are fitted to the adjacent sealable containers to be vertically connected to each other, or are fitted in an intermediate rib of the frame to be vertically connected to each other.

The present invention is the reflector control type fast reactor wherein a resilient member(s) is (are) disposed between an upper end of the uppermost sealable container in the frame and an upper end of the frame, and/or between a lower end of the lowermost sealable container in the frame and a lower end of the frame.

The present invention is the reflector control type fast reactor wherein a reflector drive unit is connected to an upper portion of the cavity part via a universal joint and a drive shaft, and the neutron reflecting part is connected to the cavity part via a universal joint.

The present invention is the reflector control type fast reactor wherein a gap is formed between the neutron reflecting part and the cavity part.

The present invention is the reflector control type fast reactor wherein a volume of the neutron reflecting part excluding the coolant channels is between 80% and 95% of a total volume of the neutron reflecting part.

The present invention is the reflector control type fast reactor wherein a volume of a structural member constituting the cavity part is not less than 10% of a total volume of the cavity part.

According to the present invention, with the use of a reflector including a neutron reflecting part that is formed by stacking a plurality of metal plates each having a plurality of coolant channels through which a coolant flows, there can be obtained the reflector which is difficult to be deformed by a thermal expansion and/or a thermal stress, and thus has an excellent structural robustness. Therefore, a reliable fast reflector control type fast reactor can be obtained.

DETAILED DESCRIPTION OF THE INVENTION

First Embodiment

A first embodiment of a fast reactor 1 according to the present invention is described below with reference to the drawings. FIG. 1 and FIGS. 2(a) to 2(f) show the first embodiment of the present invention.

Figure 1:
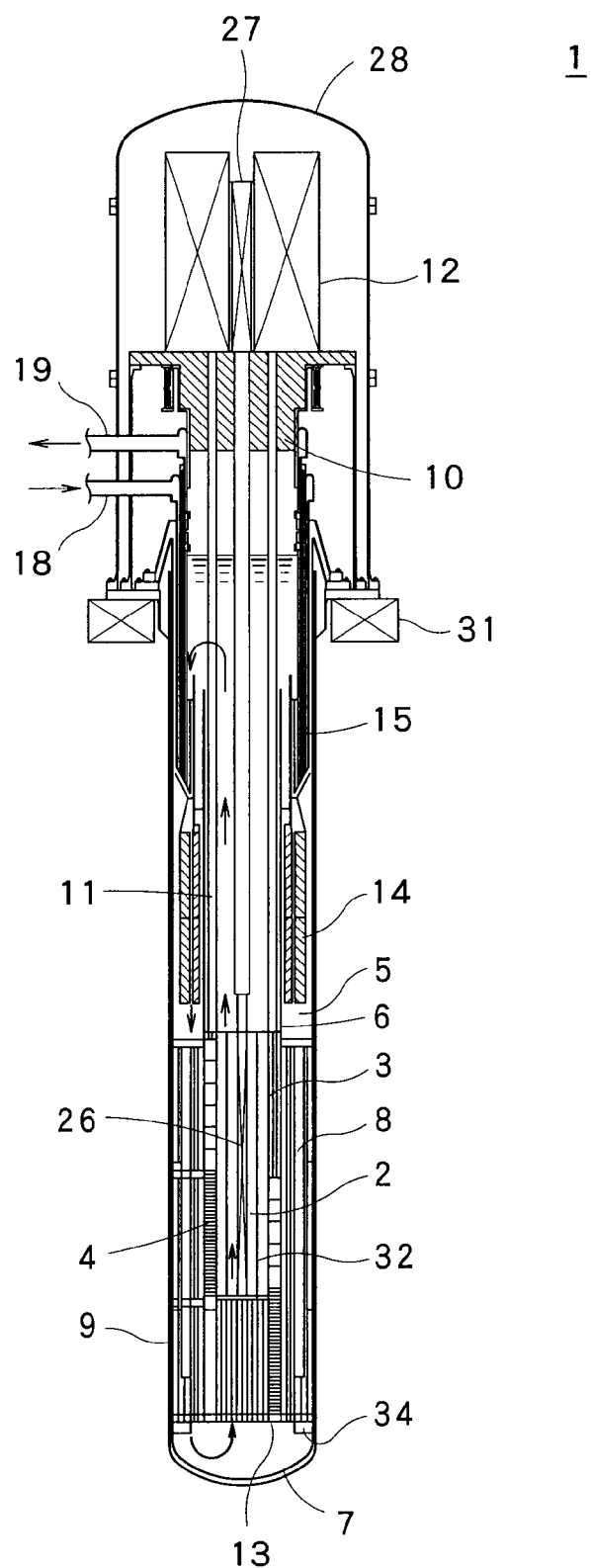
FIG. 1 is a structural view of a first embodiment of an overall fast reactor according to the present invention.

As shown in FIG. 1, the fast reactor 1 includes: a reactor vessel 7 accommodating a coolant 5; a reactor core 2 disposed in the reactor vessel 7 and immersed in the coolant 5; and a reflector 4 disposed on an outside of the reactor core 2 in a vertically movable manner. The reflector core 4 vertically moves for adjusting leakage of neutrons from the reactor core 2 so as to control a reactivity of the reactor core 2.

Figure 2:
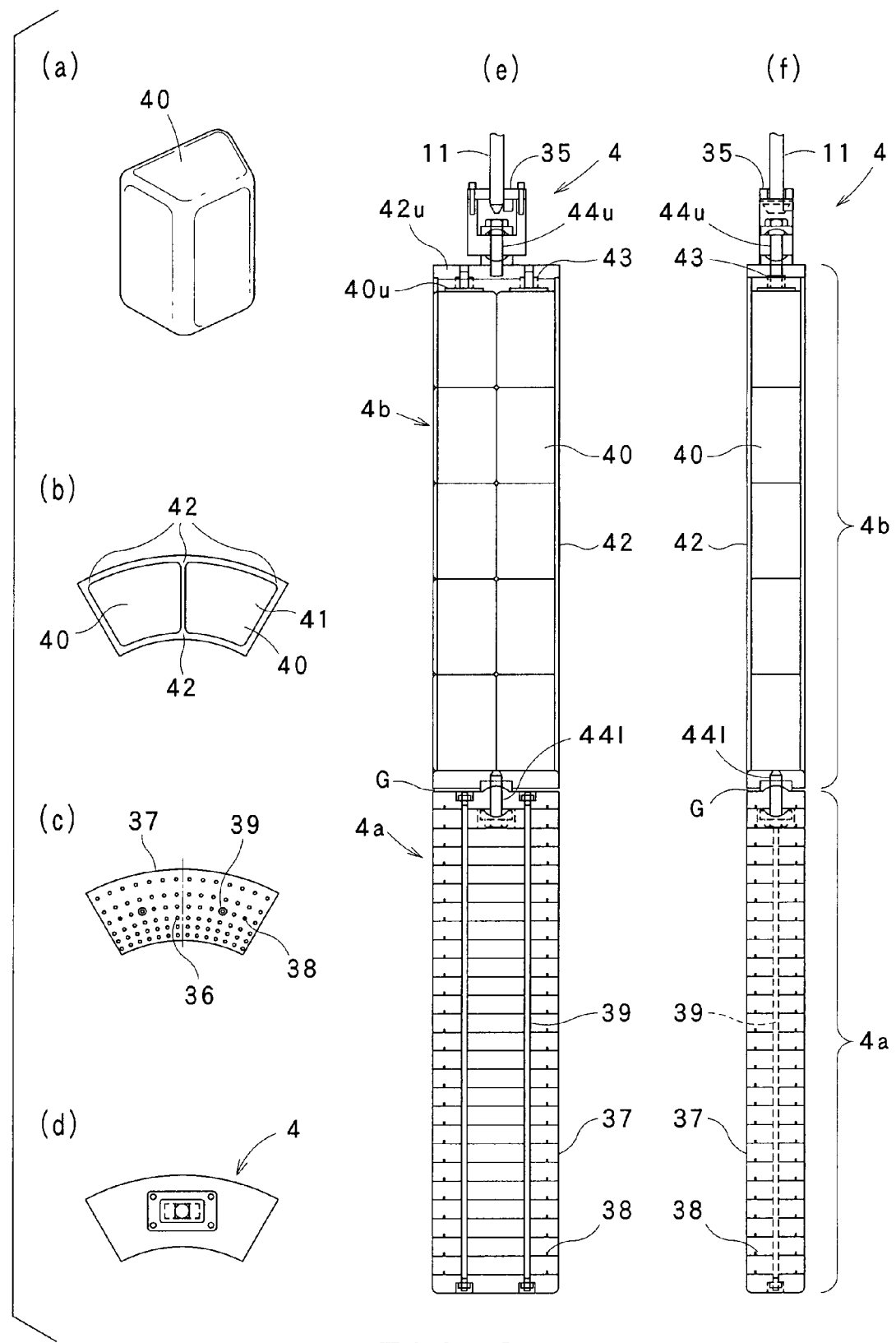
FIG. 2 is an enlarged view of the first embodiment of the fast reactor according to the present invention.

As shown in FIGS. 2(e) and 2(f), the reflector 4 has a neutron reflecting part 4a whose neutron reflective ability is higher than that of the coolant 5, and a cavity part 4b positioned above the neutron reflecting part 4a, the cavity part 4b having a neutron reflective ability lower than that of the coolant 5. FIG. 2(e) is a front view of the reflector 4 when viewed from a front side. FIG. 2(f) is a side view of the reflector 4 when viewed from a lateral side. FIG. 2(d) is a plan view of the reflector 4 when viewed from an upper side.

As described above, since the neutron reflective ability of the neutron reflecting part 4a is higher than the neutron reflective ability of the coolant 5, a reaction of the reactor core 2 can be activated. Specifically, the neutron reflecting part 4 can reflect neutrons that have been released by a nuclear fission in the reactor core 2, so that the nuclear fission continues in the reactor core 2.

On the other hand, since the neutron reflective ability of the cavity part 4b is lower than the neutron reflective ability of the coolant 5, neutrons that have been released by a nuclear fission in the reactor core 2 can transmit through the cavity part 4. Thus, a reaction of the reactor core 2 can be restrained. Therefore, a reactivity life of the reactor core 2 can be elongated.

As shown in FIGS. 2(e) and 2(f), the neutron reflecting part 4a is formed of a plurality of metal plates 37 that are stacked on each other. As shown in FIG. 2(c), each metal plate 37 is equipped with a plurality of coolant channels 36 through which the coolant 5 flows. The number of the coolant channels 36 per unit area increases from a side of the reactor vessel 7 to a side of the reactor core 2. FIG. 2(c) is a cross-sectional view of the metal plate 37 of the neutron reflecting part 4a.

As shown in FIG. 1, a core barrel 3 is disposed on an outside of the reactor core 2. As also shown in FIG. 1, the reactor vessel 7 is covered with a guard vessel 9. A fuel assembly 32 is loaded in the reactor core 2.

As shown FIG. 1 and FIGS. 2(e) and 2(f), a drive shaft 11 is connected to an upper portion of the cavity part 4b via a universal joint 44u and a joint 35. A reflector drive unit 12 is connected to an upper end of the drive shaft 11. The neutron reflecting part 4a is connected to the cavity part 4b via a universal joint 44l. As shown in FIG. 1, an upper end periphery of the drive shaft 11 is covered with an upper plug 10.

As shown in FIG. 1, disposed on an outside of the reflector 4 is a partition wall 6 that surrounds the reflector 4 and forms an inner wall of a channel for the coolant 5. The reactor vessel 7 disposed on an outside of the partition wall 6 to be spaced apart therefrom forms an outer wall of the channel for the coolant 5. In the channel for the coolant 5, a neutron shielding member 8 is arranged to surround the reactor core 2. The reactor core 2, the core barrel 3, the partition wall 6, and the neutron shielding member 8 are all placed on and supported by a reactor-core support plate 13. The reactor-core support plate 13 is supported from below by a reactor-core support table 34 fixed on an inner periphery of the reactor vessel 7.

As shown in FIG. 1, a drive unit for reactor shut-down rod 27 is disposed on an upper surface of the upper plug 10. A downwardly extending reactor shut-down rod 26 is connected to the drive unit for reactor shut-down rod 27. The drive unit for reactor shut-down rod 27 and the reflector drive unit 12 are covered with an accommodating dome 28. The accommodating dome 28 is located on a seat 31.

As shown in FIG. 1, disposed in the reactor vessel 7 are an electromagnetic pump 14 for circulating the coolant 5, and an intermediate heat exchanger 15 for exchanging a heat of the coolant 5 in the reactor vessel 7. To an upper portion of the reactor vessel 7, there are connected an inlet nozzle 18 for introducing the coolant 5 into the reactor vessel 7, and an outlet nozzle 19 for introducing the coolant 5 to an outside of the reactor vessel 7.

As shown in FIGS. 2(c), 2(e), and 2(f), the respective metal plates 37 are arranged in position by a plurality of pins 38 such that the coolant channels 36 pass through the metal plates 37. The metal plates 37 are connected to each other by vertically extending connecting rods 39.

On the other hand, as shown in FIGS. 2(a) and 2(b), the cavity part 4b has a frame 42 constituted by beams and plates, and a plurality of sealable containers 40 of a box shape held in the frame 42. An inside of each sealable container 40 may be filled with a gas 41 whose neutron reflective ability is inferior to that of the primary coolant 5, or may be maintained in a vacuum condition. In FIGS. 2(e) and 2(f), the sealable containers 40 are arranged in two columns and five levels, i.e., the ten sealable containers 40 are laid and held in the frame 42. FIG. 2(a) is a perspective view of the sealable container 40, and FIG. 2(b) is a cross-sectional view of the cavity part 4b.

As described above, not limited to the gas 41 whose neutron reflective ability is inferior to that of the primary coolant 5, each sealable container 40 may be filled with a metal, such as boron, hafnium, and tantalum, whose neutron reflective ability is inferior to that of the primary coolant 5, or a compound of these metals.

As shown in FIGS. 2(e) and 2(f), a resilient member 43 is disposed between an upper end 40u of each uppermost sealable container 40 arranged in the frame 42 and an upper end 42u of the frame 42. A coil spring, a disc spring, or a flat spring may be used as the resilient member 43.

In FIGS. 2(e) and 2(f), a load acting on the sealable containers 40 from the resilient member 43 is small. Since a load for suspending the neutron reflecting part 4a acts on the frame 42, a load acting on the sealable containers 40 is sufficiently small. Thus, a mechanical load acting on the sealable containers 40 excluding an external pressure exerted by the primary coolant 5 can be suppressed, to thereby ensure a robustness of each sealable container 40.

As shown in FIGS. 2(e) and 2(f), the resilient member 43 is disposed between the upper end 40u of the uppermost sealable container 40 in the frame 42 and the upper end 42u of the frame 42. However, not limited thereto, the resilient member 43 may be disposed between a lower end of the lowermost sealable container 40 in the frame 42 and a lower end of the frame 42.

As shown in FIGS. 2(e) and 2(f), a gap G is formed between the neutron reflecting part 4a and the cavity part 4b. Thus, the coolant 5, which has flown from below the neutron reflecting part 4a of the reflector 4 into the coolant channels 36 in the neutron reflecting part 4a, can flow outward of the neutron reflecting part 4a through the gap G. The universal joint 44l is mounted on a central portion of the gap G.

The neutron reflecting part 4a has a function of controlling a reactivity of the reactor core 2, by preventing leakage of neutrons from the reactor core 2. However, if the neutron reflecting part 4a includes too many coolant channels 36 whereby a volume of the neutron reflecting part 4a excluding the coolant channels 36 is not more than 80% of a total volume of the neutron reflecting part 4a, leakage of neutrons cannot be satisfactorily prevented. Thus, it is preferable that the volume of the neutron reflecting part 4b excluding the coolant channels 36 is between 80% and 95% of the total volume of the neutron reflecting part 4a.

Since the neutron reflective ability of the cavity part 4b is lower than that of the coolant 5, the cavity part 4b can more effectively suppress a reactivity of the reactor core 2, as compared with a case in which the reactor core 2 is covered with the coolant 5. However, when a volume of a structural member constituting the cavity part 4b is not less than 10% of a total volume of the cavity part 4b, the neutron reflective ability is increased so that the cavity part 4b cannot satisfactorily exert its function. Thus, it is preferable that the volume of the structural member constituting the cavity part 4b is not more than 10% of the total volume of the cavity part 4b.

Next, an operation of the embodiment as constituted above is described.

At first, the coolant 5 flows into the reactor vessel 7 through the inlet nozzle 18 (see, FIG. 1).

Then, the coolant 5 moves downward in the reactor vessel 7 to flow into the reactor core 5 by a driving force of the electromagnetic pump 1 (see, FIG. 1). The coolant 5, which has flown into the reactor core 2, absorbs the heat generated by a nuclear fission of the fuel assembly 32 in the reactor core 2, and then the coolant 5 is heated (see, FIG. 1).

At this time, the reflector 4 is vertically driven by the reflector driving unit 12 to adjust leakage of neutrons from the reactor core 2, so as to control a reactivity of the reactor core (see, FIG. 1). The neutron reflecting part 4a interacts neutrons generated from the reactor core 2 to generate a γ heat.

As shown in FIGS. 2(e) and 2(f), since the neutron reflecting part 4a is formed by stacking the metal plates 37, a thermal expansion and/or a thermal stress generated in the respective metal plates 37 can be dispersed. Thus, distortion of the overall neuron reflecting part 4a can be suppressed.

As shown in FIGS. 2(e) and 2(f), the drive shaft 11 and the cavity part 4b are connected to each other through the universal joint 44u, and the cavity part 4b and the neutron reflecting part 4a are connected to each other through the universal joint 44l, whereby an articulated structure is provided. Thus, it is possible to restrain warping which may be caused by a thermal expansion because of temperature difference in the radial direction and the vertical direction of the reactor. Therefore, deformation of the neutron reflecting part 4a and the cavity part 4b can be more effectively prevented.

As shown in FIGS. 2(e) and 2(f), the resilient members 43 are disposed between the upper ends 40u of the uppermost sealable containers 40 in the frame 42 and the upper end 42u of the frame 42. Thus, it is possible to absorb a vertical thermal expansion difference between the frame 42 and the sealable containers 40, and a vertical displacement of the sealable containers 40 caused by a thermal expansion of the gas in the sealable containers 40.

Then, the coolant 5 heated in the reactor core 2 raises on an inner peripheral side of the partition wall 6 to reach the intermediate heat exchanger 15 (see, FIG. 1). At this time, the coolant 5 passes through the coolant channels 36 in the metal plates 37 of the neutron reflecting part 4a (see, FIGS. 1 and 2(c)). Thus, the coolant 5 cools the γ heat generated by the interaction of the neutrons and the neutron reflecting part 4a, so that a material temperature of the neutron reflecting part 4a can be lowered. As a result, it is possible to prevent deformation of the neutron reflecting part 4a caused by a thermal expansion difference.

As shown in FIG. 2(c), the number of coolant channels 36 in each metal plate 37 per unit area increases from the side of the reactor vessel 7 to the side of the reactor core 2. Thus, the γ heat mainly generated near the reactor core 2 can be effectively cooled, so that the temperature of the whole metal plate 37 can be made uniform. As a consequence, deformation of the metal plate 37 caused by a thermal expansion difference can be restrained.

Then, the heat of the coolant 5 is exchanged, so that the coolant 5 is cooled (see, FIG. 1). The secondary coolant that has been thermally exchanged becomes vapor to rotate a turbine (not shown) so as to generate electricity.

Then, the cooled coolant 5 is moved by a driving force of the electromagnetic pump 14 to be discharged outside through the outlet nozzle 19 (see, FIG. 1).

The thus discharged coolant 5 is again allowed to flow through the inlet nozzle 18 to repeat circulation.

As shown in FIGS. 2(e) and 2(f), the neutron reflecting part 4a is formed of the stacked metal plates 37 that are connected to each other simply by the pins 38 and the connecting rods 39. Thus, in accordance with a circumstance where the neutron reflecting part 4a is used, the number of metal plates 37 can be suitably adjusted to thereby achieve manufacturing facility.

As described above, the drive shaft 11 and the cavity part 4b are connected to each other through the universal joint 44u, and the cavity part 4b and the neutron reflecting part 4a are connected to each other through the universal joint 44l, whereby an articulated structure is provided (see, FIGS. 2(e) and 2(f)). Thus, when the fast reactor 1 is urgently shut down, if the reflector 4 comes into contact with the core barrel 3 and the partition wall 6, the neutron reflecting part 4a and the cavity part 4b can be readily inclined due to the provision of the universal joints 44l and 44u. Therefore, the reflector 4 can be dropped down within a predetermined period of time.

As shown in FIGS. 2(a) to 2(f), the cavity part 4b includes the independent sealable containers 40. Thus, even if one of the sealable containers 40 is cracked or the like to invite leakage of the coolant 5 into the sealable container 40 so that the low neutron reflecting ability of the sealable container 40 cannot be maintained, influences on the reaction controllability for the reactor core 2 can be held to a minimum.

Second Embodiment

Next, a second embodiment of the present invention is described with reference to FIGS. 3(a) to 3(d). In the second embodiment shown in FIGS. 3(a) to 3(d), a frame 42 is composed of a plurality of frame units 42a which are connected to each other by bolts 46. Other structures of the second embodiment are substantially the same as those of the first embodiment shown in FIG. 1 and FIGS. 2(a) to 2(f).

Figure 3:
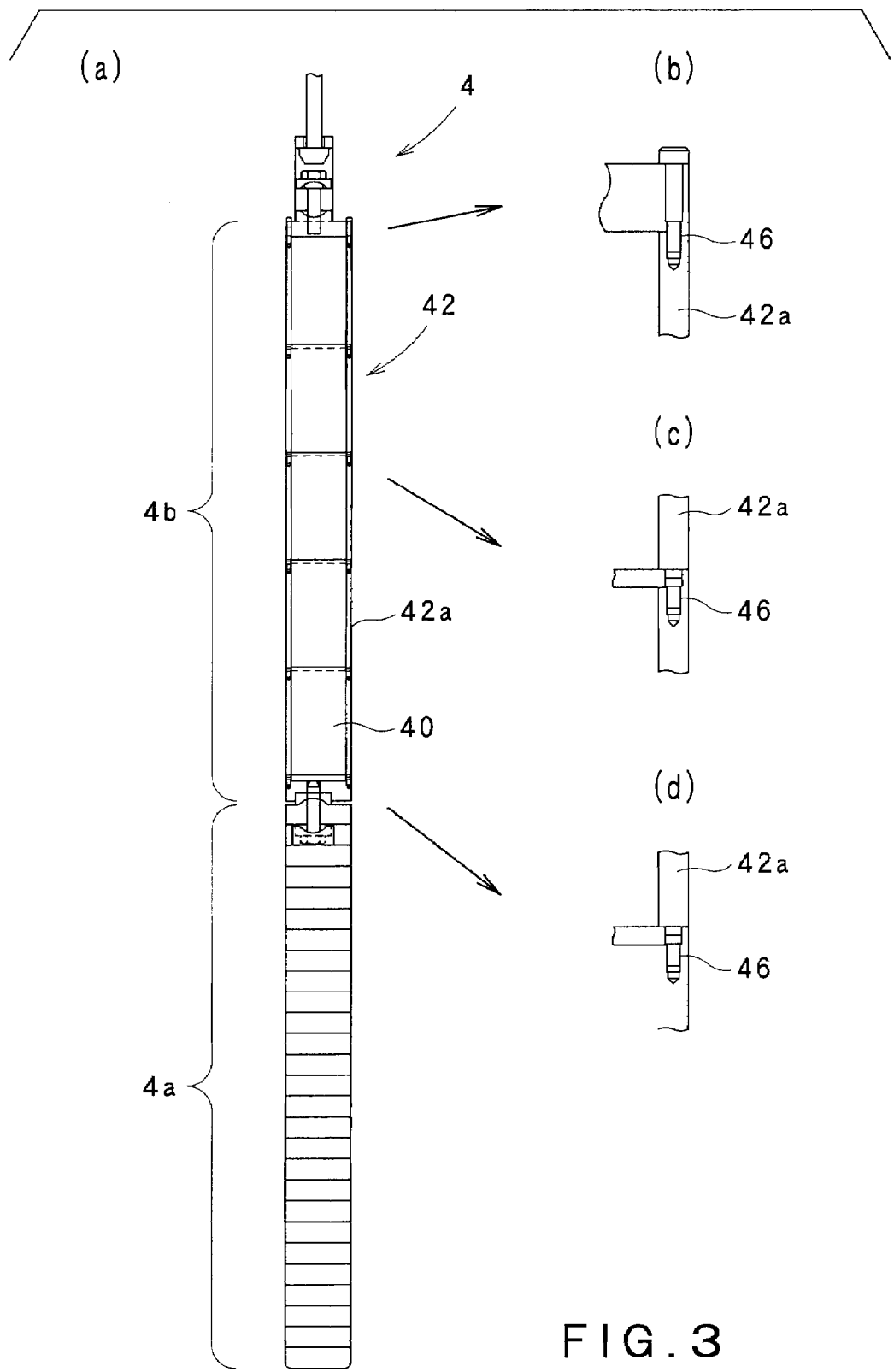
FIG. 3 is a structural view of a reflector of a second embodiment of the fast reactor according to the present invention.

In the second embodiment shown in FIGS. 3(a) to 3(d), the same parts as those in the first embodiment shown in FIG. 1 and FIGS. 2(a) to 2(f) are shown by the same reference numbers, and the detailed description thereof is omitted. FIG. 3(b) is an enlarged view of an upper end area of a cavity part 4b. FIG. 3(d) is an enlarged view of a lower end area of the cavity part 4b. FIG. 3(c) is an enlarged view of an intermediate portion between the upper end and the lower end of the cavity part 4b.

The frame 42 shown in FIGS. 3(a) to 3(d) has to have a strength sufficient for holding sealable containers 40. Since the frame 42 of the cavity part 4b is positioned near the reactor core 2, the frame 42 is prone to undergo swelling and/or degradation in toughness of material, under the influence of radiations. Thus, it is generally to use, as a material of the frame 42, chromium-molybdenum steel, in particular, 9Cr-1Mo steel or 9Cr-1Mo-V steel obtained by improving the 9Cr-1Mo steel, which material is excellent in high-temperature strength and radio-resistance.

The frame 42 is generally manufactured by welding. However, since the chromium-molybdenum steel is a material that can be easily cracked during welding, there is a possibility that the frame 42 manufactured by welding has a degraded strength, and, in consequence, the frame 42 is broken. In addition, when the frame 42 is manufactured by welding, the frame 42 has to be subjected to a preheating process before welding and a heating process after welding, which results in increase in manufacturing cost and equipment cost of the frame 42.

On the other hand, the frame 42 of the present invention is manufactured by connecting the respective frame units 42a by the bolts 46. Thus, a strength of the frame 42 can be improved, while increase in manufacturing cost and equipment cost can be inhibited. Further, since the respective frame units 42a are connected by the bolts 46, it is easy to disassemble, check, and exchange the frame 42.

Third Embodiment

Next, a third embodiment of the present invention is described with reference to FIG. 4A. In the third embodiment shown in FIG. 4A, sealable containers 40 are fitted in intermediate ribs 42m of a frame 42 to be vertically connected to each other. Other structures of the third embodiment are substantially the same as those of the first embodiment shown in FIG. 1 and FIGS. 2(a) to 2(f)).

Figure 4A:
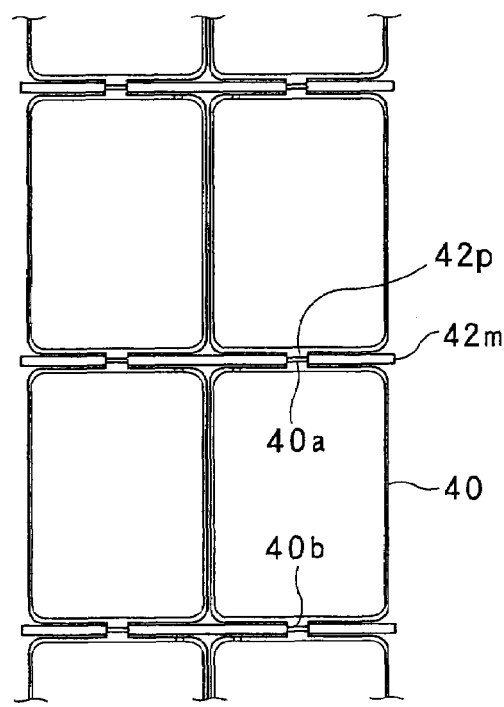
FIG. 4A is an enlarged view of a cavity part of a third embodiment of the fast reactor according to the present invention.

In the third embodiment shown in FIG. 4A, the same parts as those in the first embodiment shown in FIG. 1 and FIGS. 2(a) to 2(f) are shown by the same reference numbers, and the detailed description thereof is omitted.

In FIG. 4A, the sealable containers 40 are fitted in the intermediate ribs 42m of the frame 42 to be vertically connected to each. More specifically, each intermediate rib 42m of the frame 42 is provided with an opening 42p. Each sealable container 40 is provided with an upper projection 40a disposed on an upper end thereof, and a lower projection 40b disposed on a lower end thereof. By fitting the upper projection 40a and the lower projection 40b of the sealable container 40 in the openings 42p of the intermediate ribs 42m, the sealable containers 40 are vertically connected to each other.

Due to this structure, not only a vertical movement of the sealable containers 40 but also a horizontal movement thereof can be suitably restricted. There is a possibility that, when a reflector 4 is installed, when a reactor is operated, and when the reactor is urgently shut down, for example, the reflector 4 excessively vibrates and swings. However, collision of the sealable containers 40 and contact of the sealable containers 40 with a core barrel 3 and a partition wall 6 can be prevented. Consequently, breakage of the sealable containers 40 can be prevented.

(Modification)

Next, a modification of the third embodiment of the present invention is described with reference to FIG. 4B. In the modification of the third embodiment shown in FIG. 4B, sealable containers 40 are fitted to the adjacent sealable containers 40 to be vertically connected to each other. Other structures of the third embodiment are substantially the same as those of the first embodiment shown in FIG. 1 and FIGS. 2(a) to 2(f)).

Figure 4B:
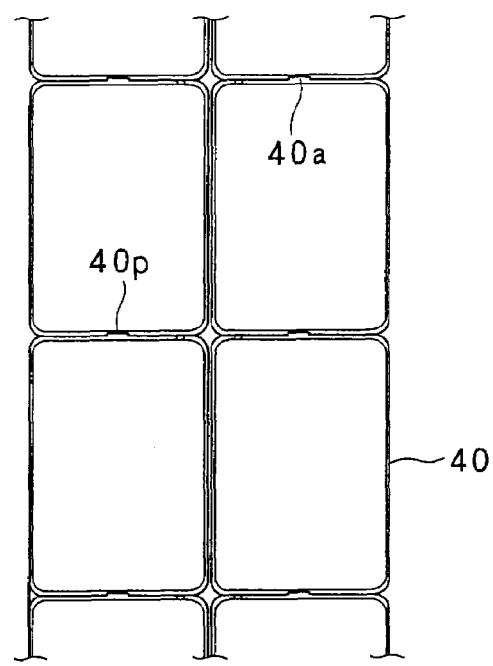
FIG. 4B is an enlarged view of a cavity part in an alternative example of the third embodiment of the fast reactor according to the present invention.
Figure 5:
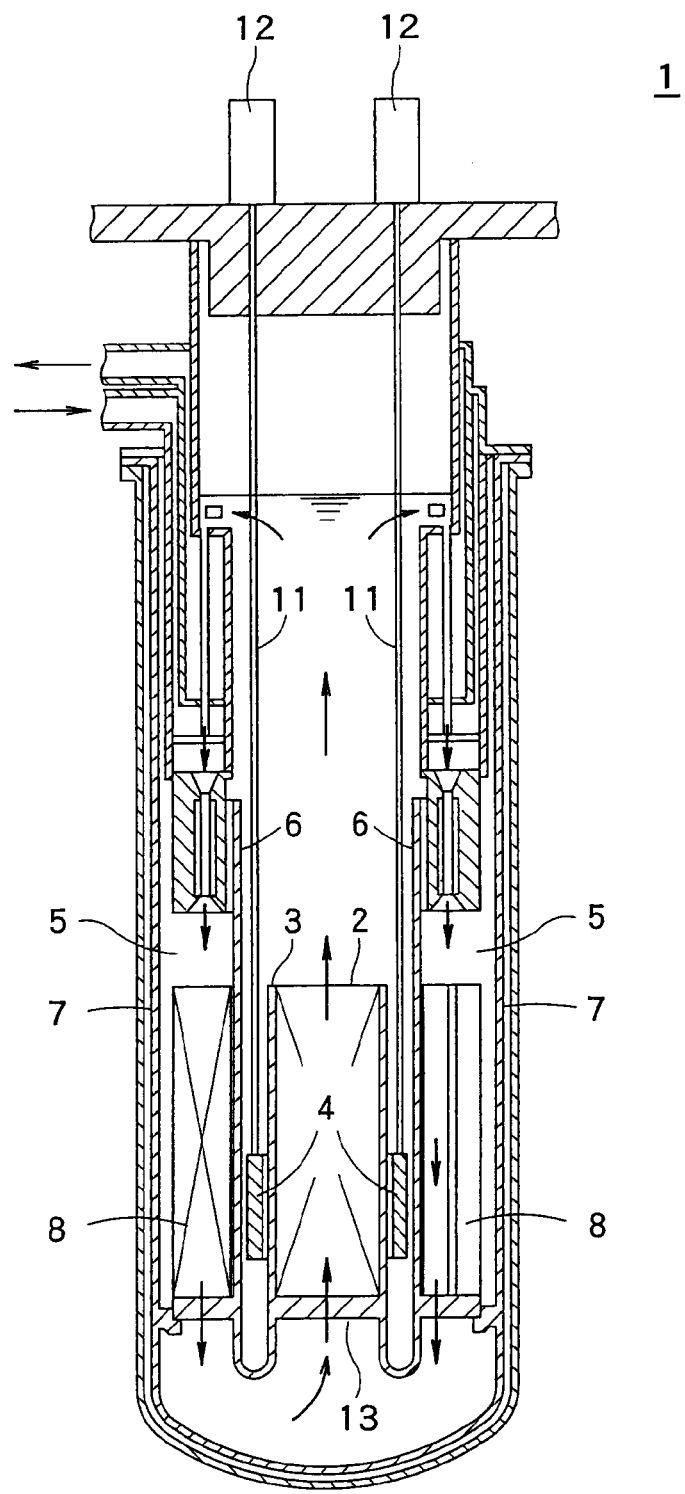
FIG. 5 is a structural view of an example of a conventional fast reactor.
Figure 6:
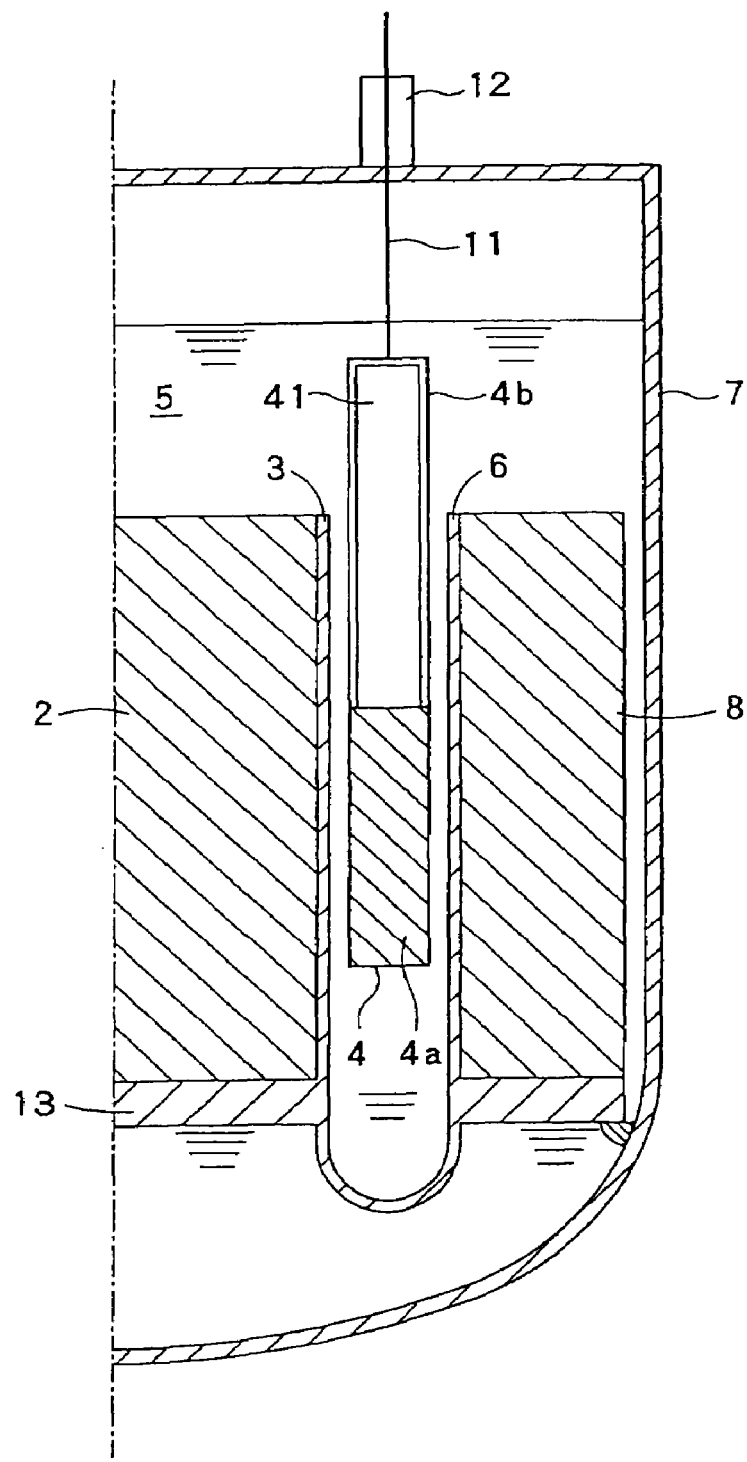
FIG. 6 is a structural view of an alternative example of the conventional fast reactor.

In the modification of the third embodiment shown in FIG. 4B, the same parts as those in the first embodiment shown in FIG. 1 and FIGS. 2(a) to 2(f) are shown by the same reference numbers, and the detailed description thereof is omitted.

In FIG. 4B, the sealable containers 40 are fitted to the adjacent sealable containers 40 to be vertically connected to each other. More specifically, each sealable container 40 is provided with an upper projection 40a disposed on an upper end thereof, and a lower recess 40p disposed in a lower end thereof. The upper projection 40a of the sealable container 40 is fitted in the lower recess 40p of the upwardly adjacent sealable container 40, and the lower recess 40p of the sealable container 40 is fitted to the upper projection 40a of the downwardly adjacent sealable container 40.

Also due to this structure, not only a vertical movement of the sealable containers 40 but also a horizontal movement thereof can be suitably restricted. There is a possibility that, when a reflector 4 is installed, when a reactor is operated, and when the reactor is urgently shut down, for example, the reflector 4 excessively vibrates and swings. However, collision of the sealable containers 40 and contact of the sealable containers 40 with a core barrel 3 and a partition wall 6 can be prevented. Consequently, breakage of the sealable containers 40 can be prevented.

The invention claimed is:

1. A fast reactor controlled with a reflector comprising:
    a reactor vessel accommodating therein a coolant;
    a reactor core disposed in the reactor vessel and immersed in the coolant; and
    a reflector that vertically moves for adjusting leakage of neutrons generated from the reactor core to control a reactivity of the reactor core, the reflector including a neutron reflecting part disposed on an outside of the reactor core in a vertically movable manner, and a cavity part positioned above the neutron reflecting part, the cavity part having a neutron reflecting ability lower than that of the coolant, said cavity part includes a frame, and a plurality of sealable containers of a box shape that are held in the frame;
    wherein the neutron reflecting part is formed of a plurality of metal plates that are stacked on each other,
    each of the metal plates has a plurality of coolant channels through which the coolant flows,
    and the number of the coolant channels in each of the metal plates per unit area increases from a side of the reactor vessel to a corresponding side of the reactor core.

2. The fast reactor controlled with the reflector according to claim 1, wherein
    the frame is formed of a plurality of frame units, and
    the respective frame units are connected to each other by a bolt.

3. The fast reactor controlled with the reflector according to claim 1, wherein
    the respective sealable containers are fitted to the adjacent sealable containers to be vertically connected to each other, or are fitted in an intermediate rib of the frame to be vertically connected to each other.

4. The fast reactor controlled with the reflector according to claim 1, wherein
    a resilient member(s) is (are) disposed between an upper end of the uppermost sealable container in the frame and an upper end of the frame, and/or between a lower end of the lowermost sealable container in the frame and a lower end of the frame.

5. The fast reactor controlled with the reflector according to claim 1, wherein
    a reflector drive unit is connected to an upper portion of the cavity part via a universal joint and a drive shaft, and
    the neutron reflecting part is connected to the cavity part via a universal joint.

6. The fast reactor controlled with the reflector according to claim 1, wherein
    a gap is formed between the neutron reflecting part and the cavity part.

7. The fast reactor controlled with the reflector according to claim 1, wherein
    a volume of the neutron reflecting part excluding the coolant channels is between 80% and 95% of a total volume of the neutron reflecting part.

8. The fast reactor controlled with the reflector according to claim 1, wherein
    a volume of a structural member constituting the cavity part is not less than 10% of a total volume of the cavity part.

* * * * *